F. W. STOSSBERG.
CULTIVATOR.
No. 176,704.                  Patented April 25, 1876.
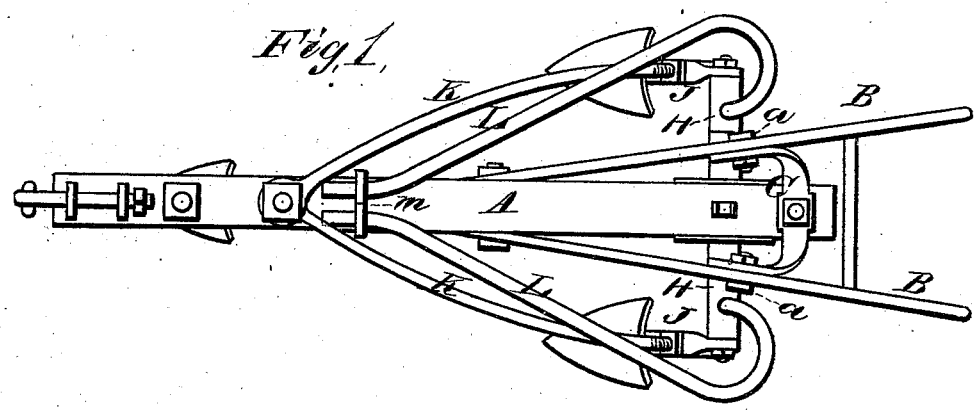
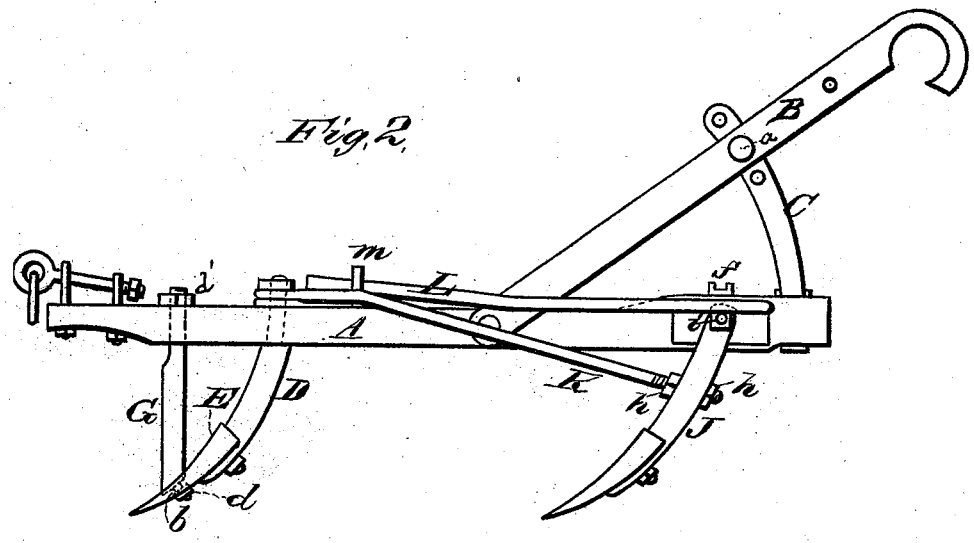
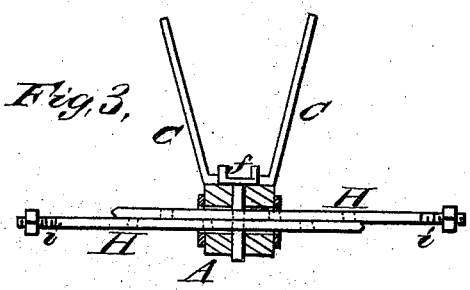

UNITED STATES PATENT OFFICE

FREDERICK W. STOSSBERG, OF POND, MISSOURI.

IMPROVEMENT IN CULTIVATORS.

Specification forming part of Letters Patent No. 176,704, dated April 25, 1876; application filed February 19, 1876.

*To all whom it may concern:*

Be it know that I, FREDERICK W. STOSSBERG, of Pond, in the county of St. Louis and State of Missouri, have invented a new and valuable Improvement in Cultivators; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my cultivator, and Fig. 2 is a side elevation of the same. Fig. 3 is a sectional detail view thereof.

The nature of my invention consists in the construction and arrangement of a cultivator, designed especially for cultivating vines and working in vineyards, as will be hereinafter more fully set forth.

In the annexed drawings, A represents an ordinary plow-beam, and B B the handles, pivoted to the beam at their lower ends. On the rear end of the beam A is secured a forked or pronged iron, C, the arms of which are curved forward, and perforated as shown, and the handles are adjusted up and down thereon, and held at any point desired by means of bolts *a a*. D represents the front standard, to which the shovel E is secured in any of the known and usual ways. G is the colter, provided at its upper end with a screw-shank, which is passed through the beam, and fastened on top thereof by a nut. The lower end of the colter is placed in a recess in the top of the shovel E, and is formed with a screw, *b*, which is passed through a hole in the shovel, and fastened by a nut, *d*, on the under side thereof. In the rear portion of the beam A is made a horizontal mortise, through which are passed two perforated bars H H, held by means of a wrench-pin, *f*, passing vertically through the beam, and any two of the perforations in the bars. These bars overlap each other, as shown, and may be adjusted out or in as required, and are held at any points desired by means of the pin *f*. On the outer end of each bar H is formed a screw, *i*, on which is screwed the upper end of the rear plow standard or foot J, whereby said standards can easily be adjusted at any angle desired. Each standard is held by a brace, K, passing through it, and provided with adjusting-nuts *h* in front and rear of the standard. The front ends of the braces K are fastened by the same nut that secures the front standard D to the beam. L L are guard-rods extending from a perforated plate, *m*, on the beam rearward, and having their rear ends bent around the outer ends of the bars H in a circle, and then attached to said bars, for the purpose of keeping the vines from catching on the ends of said cross-bars.

The cultivator thus constructed is cheap to manufacture, simple in construction, strong and durable, and not liable to get out of order.

What I claim as new, and desire to secure by Letters Patent, is—

The perforated adjustable cross-bars H H, with screws on their outer ends, in combination with the standards J, adjustable forward and backward in a vertical plane, braces K K, nuts *h h*, pin *f*, and guard-rods L L attached to the cross-bars H H at their rear ends, and adjustable therewith, substantially as described and for the purpose set forth.

In testimony that I claim the above, I have hereunto subscribed my name in the presence of two witnesses.

FREDERICK WILLIAM STOSSBERG.

Witnesses:
    FRED. DREINHÖFER,
    CHAS. H. HILLEBRAND.